United States Patent [19]
Long et al.

[11] Patent Number: 5,246,107
[45] Date of Patent: Sep. 21, 1993

[54] WALLET STYLE COMPACT DISC STORAGE UNIT

[75] Inventors: Jerry M. Long, Stockton; Christopher G. Palmer, Tracy; Peter J. Palmer, San Jose, all of Calif.

[73] Assignee: Creative Point, Inc., Fremont, Calif.

[21] Appl. No.: 932,968

[22] Filed: Aug. 20, 1992

[51] Int. Cl.⁵ .................. B65D 85/30; B65D 85/57
[52] U.S. Cl. ..................... 206/309; 206/311; 206/312; 206/313; 206/444
[58] Field of Search .............. 206/309, 311, 312, 313, 206/444

[56] References Cited
U.S. PATENT DOCUMENTS

| | | | |
|---|---|---|---|
| 4,502,596 | 3/1985 | Saetre et al. | 206/449 |
| 4,762,225 | 8/1988 | Henkel | 206/309 X |
| 4,765,469 | 8/1988 | Seifert | 206/309 |
| 4,778,047 | 10/1988 | Lay | 206/309 X |
| 4,874,085 | 10/1989 | Grobecker et al. | 206/309 |
| 5,161,682 | 11/1992 | Seifert et al. | 206/309 |
| 5,176,250 | 1/1993 | Cheng | 206/309 |

FOREIGN PATENT DOCUMENTS 21009 of 1907 United Kingdom ............... 206/313

*Primary Examiner*—William I. Price
*Attorney, Agent, or Firm*—Michael J. Hughes

[57] ABSTRACT

A wallet style compact disc storage unit (10) includes an enclosing case (12) and an interior structure (14) adapted to releasably hold a plurality of compact discs (16). The enclosing case (12) includes a clamshell structure including a first shell member (22) and a second shell member (24), each having corresponding cushions (40,42), are connected by a living hinge (26) and releasably secured by a slide latch (28). The interior structure (14) includes an even plurality of disc receiving plates (56) formed in four plate modules (58) with each plate (56) being adapted to support one of the compact discs (16) in a releasable manner. Adjacent pairs of plates (56) are hingedly connected by alternating first hinges (104) and second hinges (106) to require accordion type folding of the respective plates (56). Pretensioning of the interior structure (14) and alternating opposingly biased hinge structures cause the plates (56) to precess with a distinctive "flipping" motion to conveniently present the discs (6) to the user for viewing and removal.

19 Claims, 6 Drawing Sheets

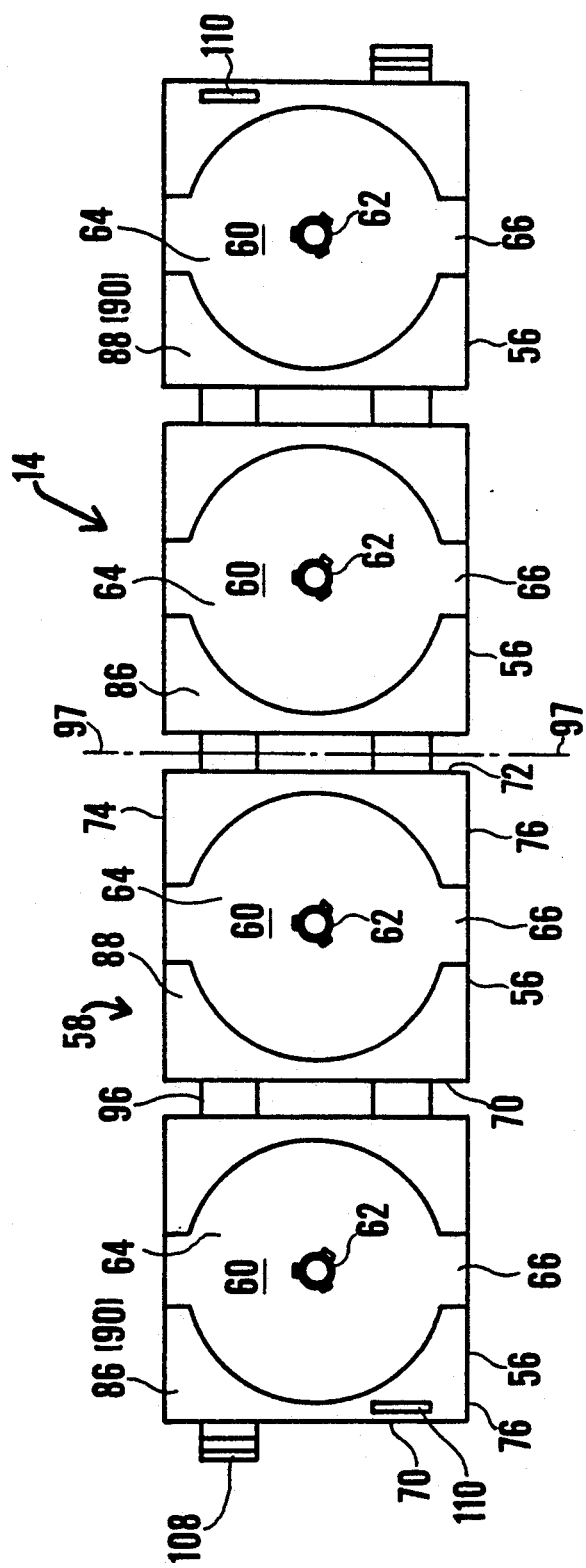
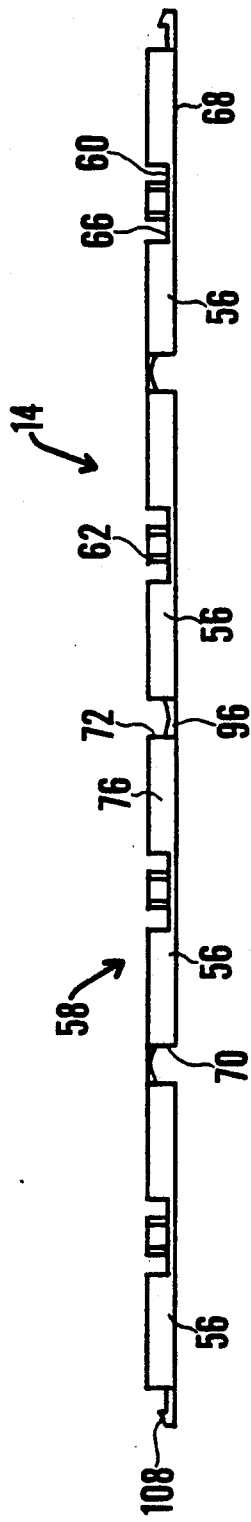
Fig. 5
Fig. 6

WALLET STYLE COMPACT DISC STORAGE UNIT

TECHNICAL FIELD

The present invention relates generally to storage modules providing protection for and access to generally planar items and more particularly to storage units for enclosing and displaying compact discs. The preferred embodiment of the present invention is particularly adapted to be an easily transportable carrying case for compact discs, separate from their associated jewel boxes.

BACKGROUND ART

One of the most popular forms of recording information in general and musical recordings in particular is the compact disc. This type of storage medium utilizes laser-based inscription and reading technology to store a vast amount of information on a relatively small item. A standard twelve centimeter diameter compact disc will easily hold the contents of a standard record album or, for data contents, as much as an entire set of encyclopedias.

With the proliferation of the compact disc ("CD") as a means of recording information has come a need for storage of a multitude of the discs. Typically, since the discs are commercially recorded and are not alterable by the user, it is necessary to maintain a library of the discs which one wishes to utilize. Storage of the individual discs in the library is an important consideration.

Typically, compact discs are contained within an associated jewel box when purchased by the customer. Many methods of storage have retained the CD within the jewel box for storage. One such example is shown and described in the Applicants' own prior U.S. Pat. No. 4,900,107, for a spring loaded individually slotted storage structure which was particularly adapted to receive items such as compact disc jewel boxes and audio cassette boxes.

However, the jewel box is far more bulky than the CD itself. Since the CD is a thin disc which is relatively resistant to damage, it is desirable and feasible to minimize space consumption, particularly for portable circumstances, by storing the disc by itself, without the associated jewel box. Various attempts have been made in the past to provide such storage methods.

One such storage is described and shown in U.S. Pat. No. 4,762,225, issued to Walter R. Henkel. The Henkel patent utilizes a series of pockets or sleeves which are connected end to end and each is adapted to retain a single compact disc therein. In the method of Henkel, a variety of CDs, outside of the associated boxes, can be stored and provide for display and access in a relatively compact manner.

However, substantial room for further improvement remains in the field. In particular, customers are interested in having portable storage modules which can store an intermediate number of compact discs in an esthetically pleasing manner. Furthermore, substantial disc protection, while providing ready accessibility, is also desirable. In addition, ease of access and cushioned storage is also a priority. None of the prior art structures have successfully provided for concentrated, compact and economical CD storage which may be easily utilized in a transportable unit.

DISCLOSURE OF THE INVENTION

Accordingly, it is an object of the present invention to provide a unit for efficiently storing an intermediate number of compact discs for ready transportability and display.

It is another object of the present invention to store individual compact discs, without the jewel boxes, in a manner which makes them readily accessible and visible for selection purposes.

It is another object of the present invention to provide a storage unit for compact discs which is esthetically pleasing both from a visual standpoint and from a tactile standpoint.

It is a still further object of the present invention to provide a storage unit for compact discs in which padded shock protection is provided.

It is still another object of the present invention to provide a storage case which will securely fasten in a closed position but may be easily opened with a single handed manipulation.

It is yet another object of the present invention to provide a storage unit for compact discs in which single handed manipulation permits the user to flip through the library selection in a rapid and predictable fashion.

Briefly, a preferred embodiment of the present invention is a wallet style compact disc storage unit which is adapted for storing an intermediate number (12 or 24 in the preferred embodiment) of compact discs, outside of the jewel boxes, in a relatively small enclosure. The wallet style compact disc storage unit includes an enclosing case which provides protection to the CD enclosed therein and an interior structure which individually supports and displays the CDs for the convenience of the user. The enclosing case is provided with an easy access latching hinge mechanism and is also provided with an esthetically pleasing and functional cushion structure which protects the individual CDs from any damage which might occur during rough handling or turbulence. The interior structure is formed of a plurality of individual plate members, each of which includes a disc receiving detent on one face thereof for supporting a CD. The plates are connected end to end by an alternating series of hinges, with the alternating hinges being differentiated from one another by their placement with respect to the face/edge apexes of the plates. The particular alternating hinge structure causes the interior structure to have a "flipping" capability in that longitudinal force on one plate will cause the following plates to flip forward into a display position, thus permitting sequential viewing of the CDs contained in the storage unit. The interior structure consists of one or more rows of longitudinally connected series of plates which are attached to the exterior shell only at the end of the outermost plates. The connection with the shell is in the form of a hinged connection and the shell itself contributes to the flipping action created in the interior structure. The hinged plates, themselves, are independent of any securing to the shell, except at the ends of the exterior most plates.

An advantage of the present invention is that the individual CDs are readily and sequentially displayed for ready viewing and access to the user.

Another advantage of the present invention is that the entire label of the CD is visible to the user, regardless of the rotational orientation of the CD.

Still another advantage of the present invention is that the interior structure can be single handedly manipulated by the user for rapid and predictable sequential viewing of the contents.

Still another advantage of the present invention is that the cushioned exterior minimizes the possibility of damage to the contents by providing a preloading when the case is in a closed position and a shock absorbing cushioning effect in the event of mishap.

A still further advantage of the present invention is that the components of the interior structure may be themselves modularly constructed for economy of manufacture and uniformity of structure.

Yet another advantage of the present invention is that it is readily adapted for usage with a larger number of CD supporting plates, if desired.

These and other objects and advantages of the present invention will become clear to those skilled in the art in view of the description of the best presently known mode of carrying out the invention and the industrial applicability of the preferred embodiments, as described herein and as illustrated in the several figures of the drawings.

BRIEF DESCRIPTION OF THE DRAWINGS

FIG. 5 is a top plan view of a four plate construction module utilized for the interior structure;

FIG. 6 is a side elevational view of the four plate module illustrated in FIG. 5.

BEST MODE OF CARRYING OUT THE INVENTION

The best presently known mode of carrying out the invention is a wallet style compact disc storage unit which is particularly adapted for being carried in the pockets, packs or hang bags of the user. The disc storage unit is particularly adapted for carrying an intermediate number of compact discs in a readily accessible and visually esthetically pleasing manner. While the best mode for carrying out the invention was only one connected series of plates, it should be noted that the invention can include two or more such structures.

Figure 1:
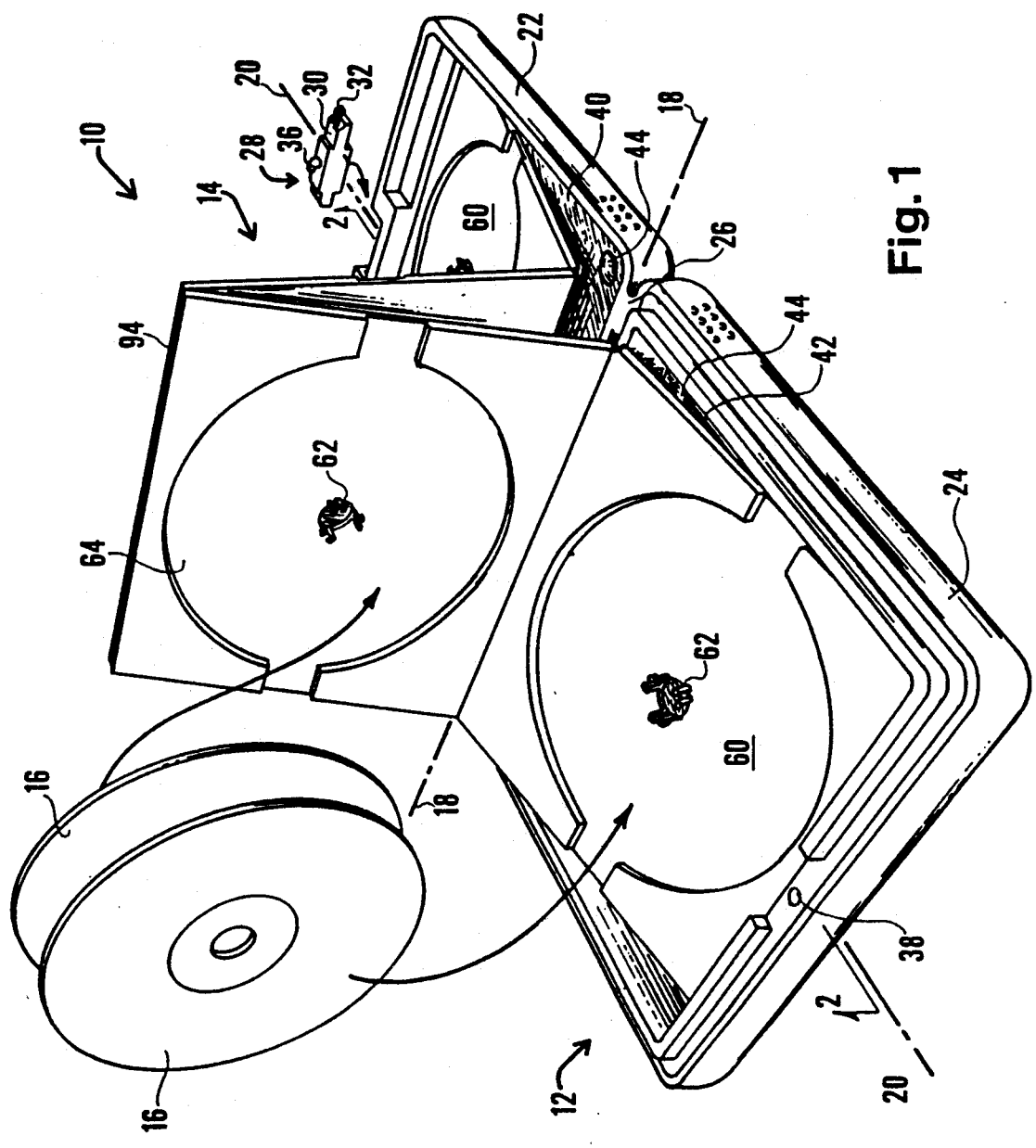
FIG. 1 is a perspective view of a wallet style compact disc storage unit according to the preferred embodiment of the present invention, shown in a open display mode.

Referring now to FIG. 1, the wallet style compact disc storage unit of the preferred embodiment is illustrated in a perspective view and is designated by the general reference character 10. The storage unit 10, which is illustrated in the open or display mode is also adapted to be utilized in a closed or storage mode, such as is illustrated in FIG. 2.

The compact disc storage unit 10 includes an enclosing case 12 and an interior structure 14, which actually supports and displays a plurality of individual compact discs 16. For the purposes of understanding the invention, a hinge axis 18 is shown, about which the enclosing case 12 opens and closes, and a transverse axis 20 is illustrated, showing the direction of flipping of the various components of the interior structure 14.

Figure 2:
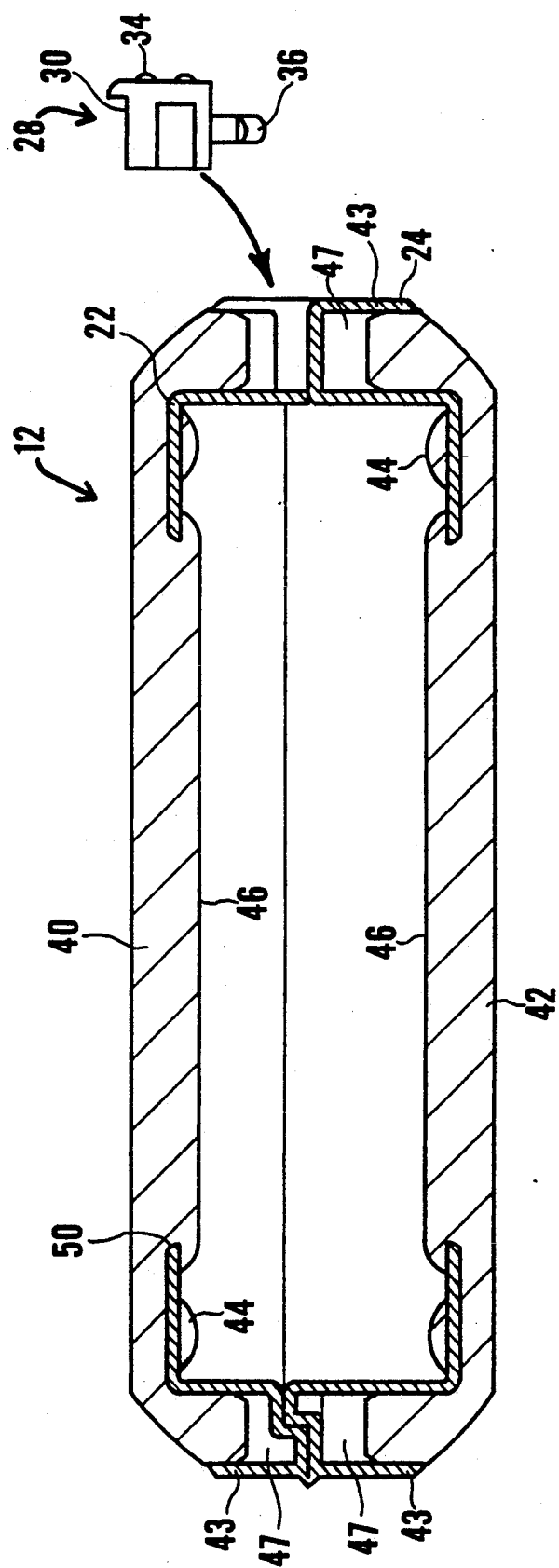
FIG. 2 is a cross-sectional view, taken along line 2—2 of FIG. 1, showing the components of the exterior enclosing case only, illustrated in a closed or storage mode.
Figure 3:
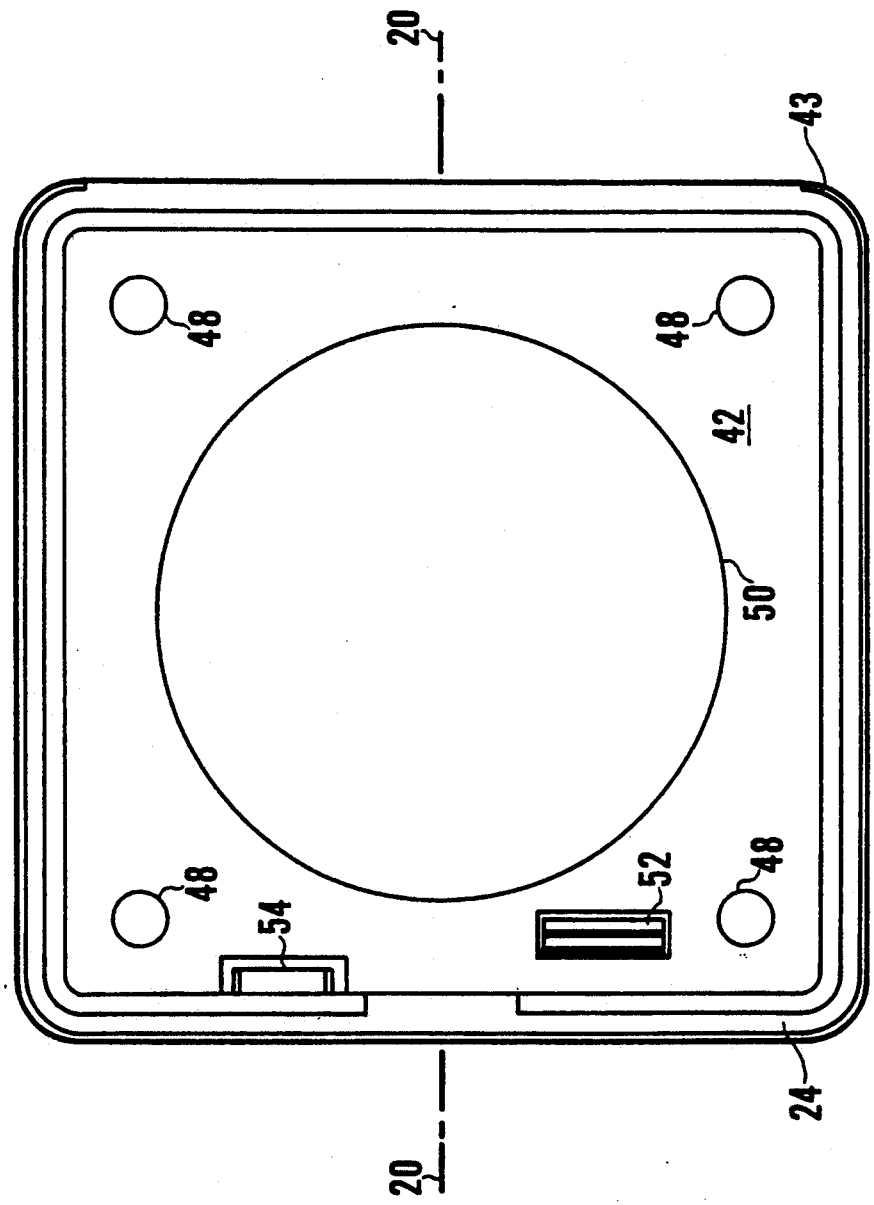
FIG. 3 is a top plan view of the second shell member and the associated second cushion, shown with the interior structure removed therefrom.

The enclosing case 12, as is illustrated in FIGS. 1, 2 and 3, includes a first shell member 22 (here shown as the top) and a second shell member 24 (here shown as the bottom). The first and second shell members 22 and 24 are generally in the form of rectangular solids, hollow to the interior, and are connected along one exterior edge by a living hinge 26. In the preferred embodiment 10, the shell members 22 and 24 are integrally formed with the living hinge 26 to form a single component.

A slide latch mechanism 28 is provided to secure the enclosing case 12 in a closed position, when desired. The slide latch 28, which is primarily illustrated in FIG. 2, includes a sliding member 30 adapted to mate with the first shell member 22. A spring loader 32 is provided to urge the sliding member 30 in a particular direction so that the enclosing case 12 does not become inadvertently open. A pattern of traction bumps 34 is provided on the sliding member 30 so that the user can easily manipulate the sliding member 30 against the spring loader 32 in order to open the case 12. A latch post 36 depends from the sliding member 30 and is adapted to engage a post aperture 38 situated on the second shell member 24. The post aperture 38 includes a groove into which the latch post 36 fits and is trapped when the sliding member 30 is urged in the direction provided by the spring loader 32.

The enclosing case 12 is provided with cushioning to protect the contents. A first cushion 40 is associated with the first shell member 22 and a second cushion 42 is associated with the second shell member 24. The first and second cushions 40 and 42, which are substantially identical in structure, are adapted to fit about a portion of the shell members 22 and 24 and to mate therewith for a semipermanent attachment. The attachment between the cushions 40 and 42 and the shell members 22 and 24 is accomplished by a peripheral rim 43 extending about the portions adjacent to the corresponding shell half, by four mounting protrusions 44 situated in the interior corner portions of the cushions 40 and 42 and by a central dome pad 46 on the interior surface thereof. Each of the shell members 22 and 24 is provided with a corresponding peripheral rim gutter 47, with four corresponding mounting apertures 48 in the corners thereof and with a central dome aperture 50. As seen in FIG. 2, the mounting protrusions 44 and the dome pad 46 are molded so as to be undercut slightly such that, once they are pushed through the associated apertures 48 and 50, they lock into position and provide a semipermanent mounting of the cushions 40 and 42 to the shell members 22 and 24. A friction fit is maintained between the peripheral rim 43 and the rim gutter 47. The peripheral rim 43 is selected to be slightly greater in thickness than the interior opening of the rim gutter 47 so that when the cushion members 40 and 42 are pushed into the shell halves 22 and 24, a tight friction fit is maintained. The friction fit between the peripheral rim 43 and the rim gutter 47 is sufficiently tight that alternate embodiments of the invention do not include the interlocking mounting protrusions 44 and mounting apertures 48 nor is the dome pad 46 and the dome aperture 50 necessary, except for the cushioning aspect. No adhesive is necessary in any of the mating between the cushion members and the shell members.

The first and second cushions 40 and 42 are selected to be constructed of a pliable cushioning material which is very durable and resilient. This provides an esthetically pleasing exterior appearance, as seen in FIG. 1, and also protects the contents of the storage unit 10 from damage upon dropping. The dome pads 46 are of particular value in protecting the contents since they have the same general shape as the CDs themselves and provide a preloading to the interior structure 14 so as to prevent vibration, which might otherwise cause damage to the individual CDs 16.

The interiors of each of the first shell member 22 and the second shell member 24 are also provided, at positions displaced along the direction of the transverse axis 20 from the living hinge 26, with a flexible tab 52 and an associated tab receiving slot 54. The flexible tab 52 and the tab receiving slot 54 of each of the shell members 22 and 24 is adapted to mate with similar components of the interior structure 14.

The interior structure is primarily illustrated in FIG. 4, 5, 6, 7A and 7B with some reference to FIG. 1. In the preferred embodiment 10, the interior structure 14 is adapted to support twelve CDs 16 but, as Will be discussed hereinafter, the interior structure 14 is modular in construction so that any multiple of four may be utilized, depending upon the interior dimensions of the enclosing case 12. Multiple rows of CD holding structures are also envisioned. Further, it is not necessary that each of the positions for holding a compact disc 16 be filled, and it is totally independent of the operation whether a compact disc 16 is in position in any of the holding mechanisms.

The compact discs 16 are supported in position on a series of substantially identical plate members 56. The plate members 56 are arranged, in the preferred embodiment 10, in four plate modules 58, such as are particularly illustrated in FIGS. 5 and 6. The four plate modules 58 are interconnected, end-to-end, to make up the complete interior structure 14.

Each plate 56 within the four plate module 58 includes a front face 60 upon which the compact disc 16 is to be mounted. The front place 60 includes a hub pedestal 62 which is a flexible structure adapted to frictionally mate with the central aperture on a compact disc 16 so as to hold it firmly in position. The hub pedestal 62 serves a purpose similar to that of the central mounting pedestal which is found in a typical compact disc jewel box. Also, similar to the structure found in a jewel box, the hub pedestal 62 is surrounded by a disc detent 64 in the general shape of a round compact disc 16, but with a slightly greater diameter so that the CD 16 Will fit smoothly therein. In the preferred embodiment 10 the front face 60 is provided with one or more access depressions 66 which are scooped about the disc detent 64 to allow the user to access the edge of the CD 16 and disengage it from the hub pedestal 62, even when the sides of the plate 56 are not readily accessible. The access depressions 66 are particularly adapted to receive a finger tip or finger nail to allow the user to get under the edge of the CD 16.

The plates 56 of the preferred embodiment 10 are constructed to have generally uniform material thickness therethrough for easy manufacture. Accordingly, a rear face 68 of the plate corresponds 56 in shape to the reverse of the front face 60. The manner of assembly of the interior structure 14, as will be discussed in greater detail hereinafter, is such that the rear faces 68 of the plates 56 will always face adjacent other rear faces 68 and the front faces 60 will abut against front faces 60. Consequently, the faces 60 and 68 are formed so as to have a generally planar exterior extent, so that a flat justifixition and compact folding together may be achieved.

Each of the plate members 56 of the present invention may be considered to be a thin rectangular solid member having a leading edge 70, and an opposing trailing edge 72, a first side edge 74 and a second side edge 76. As may be seen particularly in the drawing, the disc detent 64 extends such that the side edges 74 and 76 are partially open to the disc detent 66 such that the CD 16 which may be contained therein and supported on the hub pedestal 62 is accessible from the side edges 74 and 76.

Since each of the plate members 56 has a discrete thickness the leading edge 70 and the trailing edge 72 have spatially separated apexes corresponding to the intersection of the edges with the front face 60 and the rear face 68 of the plate 56. These are defined as a leading front apex 78, a leading rear apex so, a trailing front apex 82 and a trailing rear apex 84. The identification of the apexes 78, so, 82 and 84 is important for an understanding of the unique manner in which the adjacent plates 56 are connected together and interact.

Figure 4:
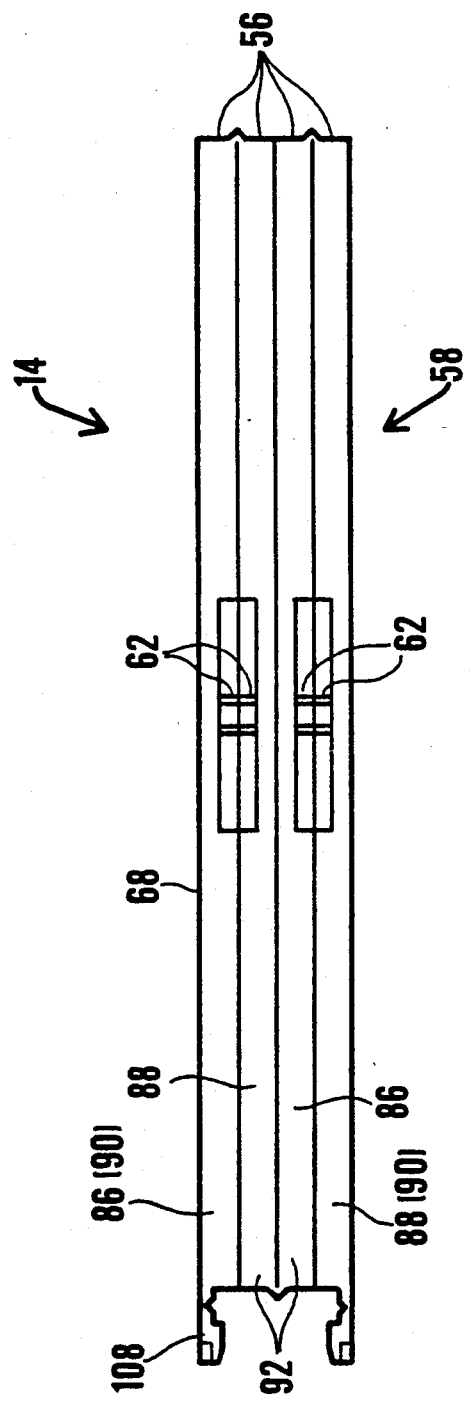
FIG. 4 is a side elevational view of the interior structure of the present invention including the CD holding plates.

For the purposes of understanding the operation of the interior structure 14, it is helpful to think of the plates 56 as being classified as including an equal number of first plates 86 and second plates, 88 the difference between which is discussed below. Further, the interior structure 14 includes an end plate 90 at each end of the overall structure. The end plates 90 interface with the enclosing case 12 to secure the interior structure 14 to the enclosing case 12. One of the end plates 90, as illustrated in FIG. 4, particularly, is a first plate 86, While the other end plates 90 is a second plate 88. All of the other plates except for the two end plates 90 are defined as intermediate plates 92. Throughout the entire interior structure, the plates defined as first plates 86 and those defined as second plates 88 alternate.

Figure 7B:
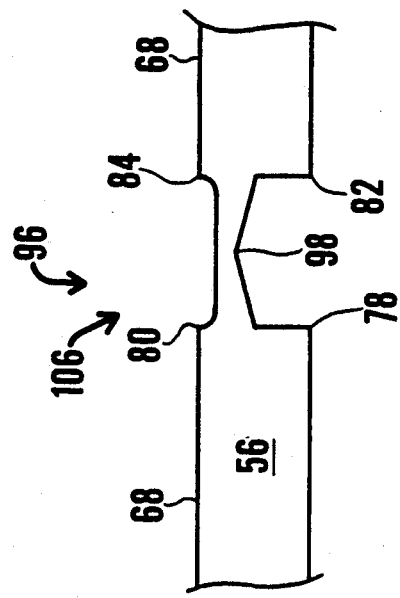
FIGS. 7A and 7B are side elevational views of hinge segments of the present invention, with FIG. 7A illustrating a first (front) hinge structure and FIG. 7B illustrating a corresponding second (rear) hinge structure.
Figure 7A:
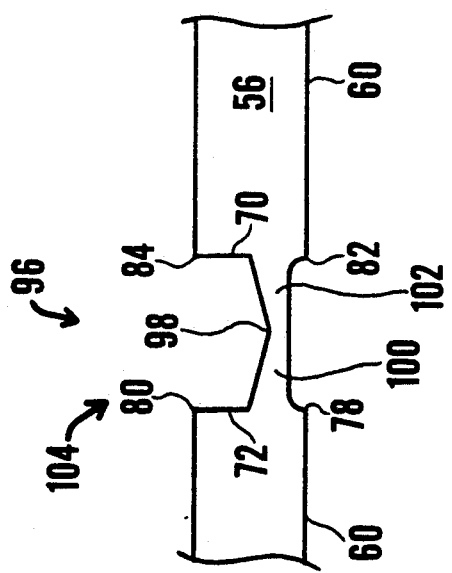

The adjacent plate members 56 are connected together by plate hinges 94. In the preferred embodiment 10 the plate hinges 94 do not run the full extent of the corresponding leading edges 70 and trailing edges 72 of the adjacent plate 56, but in order to save materials, are formed as a pair of hinge segments 96 which are separated along a hinge axis 97 from each other. As is best seen in FIGS. 7A and 7B, each hinge segment 96 is a living hinge structure having a centrally positioned fulcrum 98 where the material of the hinge segment 96 is thinnest and the hinge segment 96 is most adapted to bend along a line parallel to the hinge axis 97. A first hinge arm 100, connecting the fulcrum 98 to the trailing edge 72 of an adjacent plate 56, lies on one side of the fulcrum 98 while a second hinge arm 102 correspondingly lies on the opposing side of the fulcrum 98 to connect to the leading edge 70 of a second adjacent plate member 56.

As it is particularly illustrated in FIGS. 7A and 7B, the hinge segments 96 may be considered to be of two distinct types, with one being a first hinge 104, also known as a front hinge 104, while the other is a second hinge 106, also knows as a rear hinge 106. The manner in which these two types of hinge segments 96 are arranged determines the operation of the interior structure 14. As illustrated in FIG. 7A, a first hinge 104 connects a leading front apex 78 to a trailing front apex 82, with the fulcrum 98 being arrayed such that rotation about the hinge axis 97 such that the front faces 60 are urged together is favored and such that rotation about the fulcrum 98 in the opposing direction is inhibited by the limitation that the rear apexes 80 and 84 would abut before a substantial degree of rotation could be achieved.

As is illustrated in FIG. 7B, the second hinge 106 acts to extend between a trailing rear apex 84 of one plate member 56 and a leading rear apex 80 of an adjacent plate member 56. The structure of the second hinge 106 is such that it urges the planar abutment of the rear faces 68 of the adjacent plate 56 and inhibits the contrary rotation by the abutment of the opposing front apexes 78 and 82.

The assembly of the interior structure 14 is accomplished such that, once assembled, the rear hinges 106 Will be positioned such that they are farthest removed from the living hinge 26 of the exterior case, while the first (front) hinges 104 will be most closely arrayed to the living hinge 26. When the enclosing case 12 is closed the plates 56 will stack in a more less planar abutting array with the first hinges 104 being aligned with one another and the second hinges 106 also being aligned with one another.

For convention of description it is assumed that a first plate 86 will be adjacent to the first shell member 22 and a second plate 88 will be adjacent to the second shell member 24 when the storage unit is fully assembled. Given this convention, it may be stated that the first plates 86 are characterized by having a second hinge 106 along the leading edge 70 and a first hinge 104 along the trailing edge 72. Conversely, a second plate 88 will have a first hinge 104 on its leading edge 70 and a second hinge 106 on its trailing edge 72. Since the first plates 86 and the second plates 88 alternate throughout the interior structure 14, it may also be seen that the first hinges 104 and second hinges 106 also alternate.

The particularly preferred interior structure 14 is constructed of four interconnected four plate modules 58. The modules 58 must be operable in such a manner that the interconnection therebetween has the same hinge characteristics as the plates 56 within the module. The preferred embodiment 10 accomplishes this by utilizing a connecting hinge tab 108 on one of the modules 58 which interfaces with a connecting slot 110 on an adjacent module 58. The connecting hinge tab 108 and the connecting slot 110 are substantially similar in structure to the corresponding flexible tabs 52 and the tab receiving slot 54 which are found on the shell members 22 and 24. The structure of the connecting hinge tabs 108 and the connecting slots 110 is illustrated in FIGS. 5 and 6, particularly. As is especially seen in FIG. 5, the leading edge 70 of the first plate 56 in the four plate module 58 is provided with a connecting hinge tab 108 near its second side edge 76 and a connecting slots 110 near its first side edge 74. Correspondingly, the trailing edge 72 of the fourth plate 56 in the module 58 is provided with the complimentary arrangement such that adjacent modules 58 may be connected together to have hinge segments 96 which are identical in operation to those between interior plates 56. The orientation of the connecting hinge tabs 108 is such that these will always be in the nature of second (rear) hinges since the first plate 56 in the leading position for each module 58 will always be a first plate 86 and the trailing plate 56 of each module will be a second plate 88. Correspondingly, rear hinges 106 are utilized at both ends of the interior structure 14 to connect to the shell members 22 and 24.

For ease of construction, the interior structure 14 is formed of injection molded plastic with a single mold being prepared for the purpose of generating the four plate modules 58. In the preferred embodiment, the materials selected for the four plate module 58 is polypropylene and it is selected to have a preferred thickness of, 0.10 cm (0.040 in) nominal wall. It has been found that this provides adequate structural stability while minimizing cost factors.

The materials of the enclosing case are also plastics which are also selected for esthetic appeal as well as structural integrity. The shell members 22 and 24 and their incorporated living hinge 26 are constructed of polypropylene with the shell member having a thickness of 0.15 cm (0.60 in) nominal wall. The cushion members 40 and 42 are selected of a softer material, with the presently preferred material being polyurethanefoam. The thickness is selected both for the purposes of providing proportional visual appeal and also adequate cushioning to the contents. In the preferred embodiment, the average thickness of the cushion members 40 and 42 along the exterior of the shell members 22 and 24 is 0.63 cm (0.25 in).

As previously discussed, the dimensions of the wallet style compact disc storage unit 10 of the present invention may be modified to accommodate a variety of numbers of CDs 16 therein. Furthermore, the unique operation of the exterior structure 14 maybe utilized as a support structure for any sort of generally planar content. It is envisioned that non-circular contents such as cards may be supported on plates 56 of a similar structure for alternate purposes.

In addition, the materials utilized in the present invention may be modified according to a particular need. The characteristics of the living hinges 26 and the hinge segment 96 must be maintained for proper operation, but a modification of materials could still be accomplished while retaining these characteristics.

Those skilled in the art will readily observe that numerous other modifications and alterations of the materials, and structure of the present invention may be made while retaining the teachings. Accordingly, the above disclosure is not intended as limiting. The appended claims are therefore to be interpreted as encompassing the entire spirit of the scope of the invention.

INDUSTRIAL APPLICABILITY

The wallet style compact disc storage unit 10 of the present invention is particularly adapted to retain a plurality of compact discs 16 within a cushioned enclosing case 12. The enclosing case 12 is selected to either complete enclose and protect the contents or to open in such a manner that the contents are displayed. The cushioning provided by the first and second cushions 40 and 42 provides excellent protection to sensitive contents, such as breakable CDs 16.

The interior structure 14 is particularly adapted to provide excellent display and access to the CDs 16 supported thereon when the enclosing case 12 is in the open position. In particular, the alternating hinge structure of the present invention provides for easy single handed access to the CDs 16. This is particularly important in situation such as automobiles, where the user may not have both hands free to switch from one CD 16 to another.

In operation, the user will have placed a number of CDs 16 within the wallet style compact disc storage unit 10 by supporting one CD 16 on each of selected ones of the hub pedestals 62 associated with a particular plate member 56. When the case 12 is open, depending upon the orientation, the interior structure 14 will flip open such that the front faces 60 of two adjacent plates 56 will be displayed toward the opening. The manner in which the plates 56 are connected to each other and to the enclosing case 12 assures that the rear faces 68 will never be presented to the user.

If the user is not satisfied with the two particular CDs 16 which will be displayed and accessible upon opening, it is a simple matter to "flip" through the interior structure 14 until the desired CD is displayed. This is accomplished by pulling one of the exposed rear hinges 106 toward the display position. The characteristics of the living hinge segments 96 interconnecting the plates 56 and the end supported hinges provided by the interconnection between the interior structure 14 and the enclosing case 12 will then cause the next adjacent pair of CDs 16 to be displayed. The only stable positions for the interior structure 14 will be with a pair of front faces 60 being displayed such that easy angular access to the CDs 16 supported thereon is achieved.

Assuming material uniformity, no particular pair of CDs 16 will be preferred and each displayed pair will be in a stable configuration. This allows the user to flip through the choices as desired, with each pair being displayed for selection or nonselection as the user sees fit, before flipping to the next pair.

The characteristics of the living hinge mechanism of the interior structure also provide a certain amount of preloading and springingness to the interior structure. Although the adjacent plate will lie flat in the closed position, there is a certain amount of spreading inherent in the living hinge structure. Thus preloading occurs and damage to the interior contents is minimized when the structure is closed, even in those embodiments of the invention in which the cushioned dome pad 46 are not provided.

Since there is a continuing need for esthetically pleasing, readily usable and structurally supportive transportable units for containing items such as compact discs, a substantial demand exists in the marketplace for units constructed according to the teaching of the present invention. It is therefore believed that the present invention will enjoy commercial utility and industrial applicability which are both widespread in nature and long lasting in duration.

We claim:

1. A storage unit for storing and displaying a plurality of flat discrete objects, comprising:

an outer shell including a first shell member and a second shell member joined by a shell hinge such that the first and second shell members partially rotate about the shell hinge intermediate an open display position and a closed storage position, the first and second shell members defining an enclosed interior volume therebetween; and an even plurality of plates situated within said outer shell for supporting the discrete objects thereon, each said plate having at least two opposed generally straight edges and having a discrete thickness, and including front side which faces away from the shell hinge and includes support means for supporting the discrete objects, a rear side, and four peripheral edges, including a leading edge positioned toward the first shell member, a trailing edge positioned toward the second shell member and a pair of opposing side edges, said plates including an equal plurality of first plates and second plates, including an end first plate situated adjacent to the first shell member, an end second plate situated adjacent to the second shell member, and an equal plurality of intermediate first plates and intermediate second plates alternately positioned between the end first plate and the end second plate;

wherein each intermediate second plate is connected at its leading edge, by a front hinge, to the trailing edge of an adjacent one of the first plates, the front hinge having its fulcrum situated adjacent to the front faces of the juxtaposed plates, and is further is connected at its trailing edge, by a rear hinge, to the leading edge of an adjacent one of the first plates, with the hinge fulcrum for the rear hinge being situated adjacent to the rear faces of the juxtaposed plates.

2. The storage unit of claim 1 wherein
the end first plate is connected at its leading edge to the interior surface of the first shell member by a rear hinge, and
the end second plate is connected at its trailing edge to the interior surface of the second shell member by a rear hinge.

3. The storage unit of claim 1 wherein
each said plate is in the form of a thin rectangular solid having a cutout portion on the front face in the shape of the outline of the discrete object.

4. The storage unit of claim 1 wherein
each of the first shell member and the second shell member includes a cushion member adapted to mate therewith to provide an exterior cushion adapted to prevent deformation of said outer shell or damage to the discrete objects in the event of impact.

5. The storage unit of claim 1 wherein
said even plurality of plates is in the form of discrete four plate modules, the four plate modules being adapted to interface end to end with one another.

6. The storage unit of claim 1 wherein
each of the front hinges and the rear hinges includes a pair of relatively thick hinge arm portions adjacent to said plates and a relatively thin fulcrum portion intermediate the hinge arm portions.

7. The storage unit of claim 1 wherein
each of the front hinges is formed so as to urge rotation thereabout such that the front faces of the adjacent plates are rotated toward opposing juxtaposition and each of the rear hinges is formed so as to urge rotation thereabout such that the rear faces of the adjacent plates are rotated toward opposing juxtaposition.

8. In a device adapted for storing and displaying generally flat discrete items in an accessible manner on the surface of a plurality of plate elements having front faces, rear faces, peripheral edges and a discrete thickness, the improvement comprising:

providing first hinge structures and second hinge structures on axially opposing peripheral edges of the plates, said first hinge structures having the fulcrum aligned with the front face and said second hinge structures having the fulcrum aligned with the rear face, with adjacent ones of the plate elements being connected together by like ones of said first and second hinges in an alternating manner, such that each of said hinge structures permits only limited rotation thereabout by the associated plate elements and such that axial force on one such plate tends to cause the following ones of the plates to follow in a flipping manner.

9. The improvement of claim 8 wherein
said first hinge structures preferentially urge rotation thereabout so as to bring the adjacent front faces into planar abutment with one another and said second hinge structures preferentially urge rotation thereabout so as to bring the adjacent rear faces into planar abutment with one another.

10. The improvement of claim 8 wherein
each said hinge structure includes a pair of opposed first hinge arms and second hinge arms, each hinge arm being tapered from relatively thick where it adjoins the plate element to relatively thin where it becomes the fulcrum.

11. The improvement of claim 8 wherein
the plate elements are restricted such that limited tension is maintained on each of the hinge elements during usage, to facilitate the following in a flipping manner.

12. A wallet style compact disc storage unit for enclosing and accessibly presenting a plurality of compact discs, comprising:
an enclosing case member, adapted to be readily opened to allow access to the compact discs situated therein and to be closed to isolate and protect the compact discs; and
a plurality of generally rigid disc holding plates including a left end plate and a right end plate, each disc holding plate having associated disc support means for holding one of the compact discs, each disc holding plate having a front face, a rear face and a discrete thickness at least at its peripheral edges and including a first hinged edge and an opposing second hinged edge, the first and second hinged edges of each of said holding plates intermediate the end plates being adapted for hingedly connecting said holding plate to a like hinged edge of an adjacent one of said holding plates, the first edge of the left end plate and the second edge of the right end plate being adapted for hingedly connecting the end plate to a securing hinge associated with said case member;
wherein the first hinged edge is characterized by having the associated hinge fulcrum aligned with the front face, and the second hinge edge is characterized by having its fulcrum aligned with the rear face.

13. The storage unit of claim 12 wherein
said enclosing case member includes a hinged clamshell structure including a first shell member and a second shell member connected by a hinge such that the shell members may be relatively rotated approximately 180 degrees about the hinge from a closed position to a maximum opened position.

14. The storage unit of claim 12 wherein
the disc support means is in the form of a hub pedestal adapted to engage the hub opening in a compact disc.

15. The storage unit of claim 13 wherein
latch means are provided on the extents of shell members opposite the hinge, the latch means securing said enclosing case member in a closed orientation until released to permit rotation about the hinge to an opened orientation.

16. The storage unit of claim 12 wherein
each disc holding plate includes a disc detent formed in the front face thereof, the disc detent being generally in the shape of the outline of a compact disc, the disc detent being deep enough so that a compact disc retained therein will not abut directly against a compact disc retained in a corresponding disc detent on a facing adjacent disc holding plate.

17. The storage unit of claim 12 wherein
said plurality of disc holding plates is in the form of identical four plate modules, hingedly connected end to end such that the interface between adjacent four plate modules is functionally indistinguishable from the hinged connection between intermediate plate members within one of the four plate modules.

18. The storage unit of claim 12 wherein
each rear face is aligned to face in the direction of a hinge portion of said case member.

19. The storage unit of claim 12 wherein
the securing hinges attach to the end plates and pretension said plurality of plate members so that said plate members are urged to flip longitudinally in response to applied longitudinal force.

* * * * *